United States Patent [19]
Zucchini

[11] 3,877,516
[45] Apr. 15, 1975

[54] CONDENSER FOR STREAMS OF GAS, IN PARTICULAR STREAMS OF GAS EXITING FROM THE WASH TANK OF PLANTS FOR DRY CLEANING

[76] Inventor: Guido Zucchini, Via del Lavoro n. 6, Castel Maggiore, Italy

[22] Filed: Mar. 6, 1973

[21] Appl. No.: 338,624

[30] Foreign Application Priority Data
Mar. 10, 1972  Italy................................. 3361/72

[52] U.S. Cl...................... 165/111; 34/77; 34/78; 62/93; 62/317; 62/406; 165/36; 165/103
[51] Int. Cl............................................. F28b 11/00
[58] Field of Search........ 60/320; 165/103, 36, 111; 62/317, 93, 406; 34/27, 73, 74, 75, 76, 77, 78

[56] References Cited
UNITED STATES PATENTS

| | | | |
|---|---|---|---|
| 895,962 | 8/1908 | Chase | 62/406 |
| 1,641,660 | 9/1927 | Bryant | 165/111 |
| 1,895,876 | 1/1933 | Bennett et al. | 165/103 |
| 2,401,806 | 6/1946 | Williams, Jr. | 60/320 |
| 2,475,255 | 7/1949 | Rollman | 62/317 |
| 3,291,205 | 12/1966 | Harris et al. | 165/111 |
| 3,570,589 | 3/1971 | Biesinger | 165/1 |
| 3,575,009 | 4/1971 | Kooney | 62/93 |
| 3,739,487 | 6/1973 | Clark | 34/77 |

FOREIGN PATENTS OR APPLICATIONS
24,885  10/1909  United Kingdom.................. 62/406

Primary Examiner—Albert W. Davis, Jr.
Assistant Examiner—S. J. Richter
Attorney, Agent, or Firm—Robert E. Burns; Emmanuel J. Lobato; Bruce L. Adams

[57] ABSTRACT

Disclosed herein is a condenser for streams of gas, in particular streams of gas exiting from the wash tank of plants for dry cleaning, consisting essentially of a condensation chamber complete with an inlet and an outlet for the gases, fixed to cooling tubes which run between the inlet and the outlet, preferably underneath them, so that only a part of the stream of gases passing through the chamber is cooled at a time.

4 Claims, 3 Drawing Figures

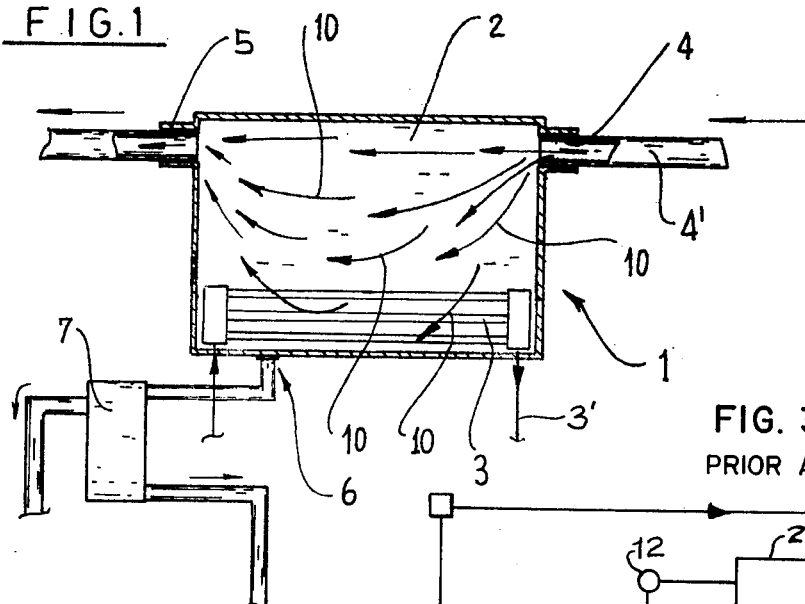
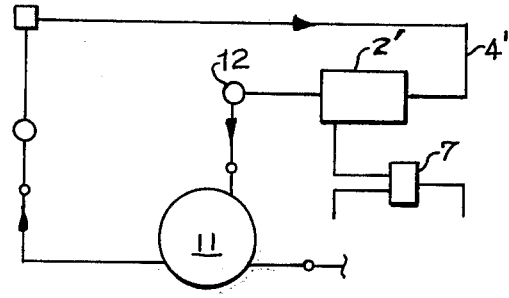
FIG. 3
PRIOR ART
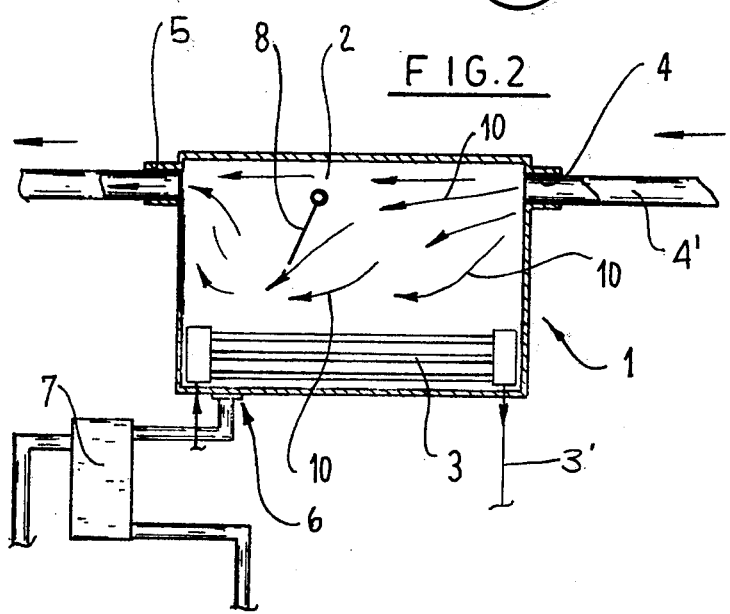

CONDENSER FOR STREAMS OF GAS, IN PARTICULAR STREAMS OF GAS EXITING FROM THE WASH TANK OF PLANTS FOR DRY CLEANING

BACKGROUND OF THE INVENTION

This invention relates to machines and plants for dry cleaning and, more precisely, has as its subject a condenser for streams of gas, in particular streams of gas exiting from the wash tank of the said plants, during the phase when the washed garments are being dried.

DESCRIPTION OF THE PRIOR ART

In the dry cleaning plants currently known (FIG. 3), prior to being sent back into the wash tank 11, the gases exiting from the wash tank at the time the washed garments are being dried pass, in the majority of cases, through a condenser device 2' in which the soluble substances contained in them, that is to say, particles of water and of solvent, are recovered. They then go into a pre-heater, 12 exit at a given temperature and, finally, pass into the wash tank 11, the purpose of this being to air the washed clothes or garments in order to remove from them the last traces of solvent and natural humidity with which they are impregnated.

The condenser devices 2' known at the present time are essentially based on the principle of taking direct action on the incoming stream of gas and this often is the cause of problems of condensation arising, mainly on account of the fact that the gases which enter the condenser transfer heat to the cooling tubes with which it is provided, as a result of heat exchange taking place and the consequential result of this is that, to the detriment of both the cost of manaufacturing and operating the plant, it becomes necessary to use condensers of a considerably higher power than that which in actual practice and in theory, ought to be used, so as to keep the cooling tubes permanently at a proper temperature for condensation purposes.

SUMMARY OF THE INVENTION

The object of this invention is to overcome the aforementioned problems and, in particular, to supply a condenser for gases, especially for streams of gas exiting from the wash tank of machines and plants for dry cleaning, of a limited power compatible with the condensation possiblities of the known condenser devices, to the advantage of the manufacturing costs and the cost of operating the plant in which the condenser is installed, as well as to the advantage of the condensating conditions for the gases.

This object has been achieved with the condenser forming the subject of the invention, essential features of which are that it comprises: a condensation chamber complete with an inlet and an outlet for the gases and; cooling tubes extending through the condensation chamber, preferably in a lower part of this chamber between the inlet and the outlet. Said cooling tubes being able to influence the stream of hot, saturated gases entering the condensation chamber to flow naturally towards them, so as to gradually cause the condensation operation to be effected proportionally with their own cooling possibilities.

BRIEF DESCRIPTION OF THE DRAWINGS

The characteristics of the condenser forming the subject of the invention will now emerge more clearly from the following description of a preferred but not the sole form of embodiment, with particular reference to the figures shown on the accompanying drawings, in which:

FIG. 1 shows, diagrammatically, a front longitudinal sectional view of the condenser;

FIG. 2 shows, diagrammatically, another front view of the condenser in question, with parts in sectional form, this time relating to a possible constructional variant; and FIG. 3 is a flow diagram of a dry-cleaning system, known from the Prior Art.

DESCRIPTION OF THE PREFERRED EMBOIDMENT:

With reference to FIG. 1, at (1) there is the condenser forming the subject of the invention and this comprises a condensation chamber (2) and cooling tubes (3) incorporated in the lower part of the body of the condenser itself. As indicated at 3', duct means are provided for passing cooling liquid through the cooling tubes 3. Such duct means, by themselves, are known to persons skilled in the art.

The upper part of the condensation chamber (2) is provided with an inlet (4) and an outlet (5) spaced from it whereby gas can pass into and out of the said condensation chamber in a direct stream, horizontal as shown, which by-passes the cooling tubes.

In a lowerpart of the condenser, there is a discharge point (6) through which condensate is discharged from the condenser and is taken to a separator (7), of a known type, in which the solvent is recovered and the parts of water are eliminated.

The stream of hot, saturated gases which flow into the condensation chamber (2) via a pipe (4') connected to the inlet (4) encounters different temperatures in said chamber which decrease proportionately in the areas of the condensation chamber closest to the cooling tubes (3). As a result thereof gas entering at 4 tends to move downwardly towards the cooling pipes (3), as shown by the arrows (10) in FIG. 1, and then to rise and to be discharged from the condensation chamber (2) through the outlet (5).

In this way the gases are not, as in earlier condensers, forced to flow between cooling tubes which extend across the direct line from the inlet to the outlet. Instead, cold is radiated from the cooling tubes and gradually summons the hot gases to be condensed proportionately to the cooling and condensing possibilities of the condenser.

As previously stated, the condensate collected in the lower part of the condenser is then discharged through the discharge point (6).

In order to encourage the stream of gases entering the condensation chamber (2) to move towards the cooling tubes (3), a pivotal baffle plate (8) (see FIG. 2) can be fitted inside the condensation chamber (2) in order to deflect the stream of incoming gases in the direction of the cooling tubes (3).

The foregoing description has naturally been given purely as an example and it is, therefore, understood that variants of a constructional nature can be introduced without the invention in any way deviating from the framework of the under-mentioned claims.

What is claimed is:

1. Condenser for hot gas, particularly for hot gas from a wash tank of a plant for dry cleaning, comprising:

a condensation chamber having inlet means and outlet means for establishing a direct stream of gas from the inlet means to the outlet means; and cooling tubes extending through a portion of the condensation chamber normally by-passed by said direct stream, said cooling tubes providing means for influencing gas to separate from said direct stream and to flow towards and between the cooling tubes so as to gradually cause condensation to be effected proportionally with the cooling capacity of the tubes.

2. Condenser according to claim 1, including baffle means adjustably disposed in the condensation chamber to additionally influence gas to move towards the cooling tubes.

3. Condenser according to claim 2, wherein said portion of the condensation chamber through which the cooling tubes extend is located below said inlet and outlet.

4. Condenser according to claim 3, wherein said cooling tubes extend through said portion in a direction generally parallel to said direct stream.

* * * * *